US012709044B2

(12) United States Patent
Eldagani

(10) Patent No.: US 12,709,044 B2
(45) Date of Patent: Aug. 18, 2026

(54) MOULD FOR INJECTION MOULDING MADE BY ADDITIVE MANUFACTURING

(71) Applicant: QTOOL S.R.L., Pont-Saint-Martin (IT)

(72) Inventor: Ahmed Hossamaldin Salah Hamed Eldagani, Turin (IT)

(73) Assignee: QTOLL S.R.L., Point-Saint-Martin (IT)

( * ) Notice: Subject to any disclaimer, the term of this patent is extended or adjusted under 35 U.S.C. 154(b) by 516 days.

(21) Appl. No.: 18/027,611

(22) PCT Filed: Sep. 22, 2021

(86) PCT No.: PCT/IB2021/058630
§ 371 (c)(1),
(2) Date: Mar. 21, 2023

(87) PCT Pub. No.: WO2022/064377
PCT Pub. Date: Mar. 31, 2022

(65) Prior Publication Data

US 2023/0234266 A1 Jul. 27, 2023

(30) Foreign Application Priority Data

Sep. 23, 2020 (IT) ........................ 102020000022399

(51) Int. Cl.
*B29C 33/38* (2006.01)
*B22F 5/00* (2006.01)
(Continued)

(52) U.S. Cl.
CPC .......... *B29C 33/3842* (2013.01); *B22F 5/007* (2013.01); *B22F 10/80* (2021.01);
(Continued)

(58) Field of Classification Search
CPC . B29C 33/3842; B29C 33/3835; B29C 45/26; B29C 45/7312; B29C 2033/042;
(Continued)

(56) References Cited

U.S. PATENT DOCUMENTS 6,112,804 A 9/2000 Sachs et al.
6,623,687 B1 9/2003 Gervasi et al.
(Continued)

OTHER PUBLICATIONS

European Patent Office, International Search Report issued in PCT/IB2021/058630, mailed Dec. 22, 2021, Rijswijk, NL.
(Continued)

*Primary Examiner* — Galen H Hauth
*Assistant Examiner* — Mohamed K Ahmed Ali
(74) *Attorney, Agent, or Firm* — Ferguson Case Orr Paterson

(57) ABSTRACT

A mould for injection moulding is provided which has a mould body having a plurality of boundary surfaces, the plurality of boundary surfaces having at least one moulding surface configured to delimit a mould cavity. The mould body is made by additive manufacturing. The mould body has a functional domain portion on which the plurality of boundary surfaces and the moulding surface are formed, the functional domain portion being composed of a solid, continuous material structure covering a fraction of the mould body, and an application domain portion which is the complement of the functional domain portion in the mould body, the application domain portion being composed of a three-dimensional material lattice structure having an ordered repetition of unit cells including a periodic minimal surface. The at least one geometrical parameter of the periodic minimal surface is tuned locally to form unit cells with different densities of material.

8 Claims, 10 Drawing Sheets

(51) Int. Cl.

| | |
|---|---|
| ***B22F 10/80*** | (2021.01) |
| ***B29C 45/26*** | (2006.01) |
| ***B29C 45/73*** | (2006.01) |
| ***B33Y 50/00*** | (2015.01) |
| ***B33Y 80/00*** | (2015.01) |

(52) U.S. Cl.
CPC .......... *B29C 45/26* (2013.01); *B29C 45/7312* (2013.01); *B33Y 50/00* (2014.12); *B33Y 80/00* (2014.12)

(58) Field of Classification Search
CPC .......... B33Y 80/00; B22F 5/007; B22F 10/80; B22F 10/00
See application file for complete search history.

(56) References Cited

U.S. PATENT DOCUMENTS

| | | | | |
|---|---|---|---|---|
| 2008/0149299 | A1 | 6/2008 | Slaughter | |
| 2019/0111590 | A1 | 4/2019 | Trivedi et al. | |
| 2021/0187793 | A1* | 6/2021 | Gearhart ................ | B33Y 10/00 |
| 2024/0091600 | A1* | 3/2024 | Roach .................... | A63B 60/50 |

OTHER PUBLICATIONS

Jiho Kim et al., 3D printed compact heat exchangers with mathematically defined core structures, Journal of Computational Design and Engineering, Apr. 7, 2020, pp. 527-550, vol. 7, No. 4, Oxford University Press, GB.
European Patent Office, International Written Opinion issued in PCT/IB2021/058630, mailed Dec. 22, 2021.

* cited by examiner

MOULD FOR INJECTION MOULDING MADE BY ADDITIVE MANUFACTURING

CROSS-REFERENCE TO RELATED APPLICATIONS

This application is a National Phase Application of PCT International Application No. PCT/IB2021/058630, having an International Filing Date of Sep. 22, 2021 which claims the benefit of priority to Italian Patent Application No. 102020000022399, filed Sep. 23, 2020, each of which is hereby incorporated by reference in its entirety.

FIELD OF THE INVENTION

The present invention relates in general to moulds for injection moulding.

BACKGROUND OF THE INVENTION

The production of plastic parts with injection moulding requires long cooling times, which represent on average two thirds of the total production cycle and lead to a high waste rate due to part warpage (deformations) because of thermal stresses. Conventional mould production techniques, in fact, present several problems.

First of all, the technology used, i.e. the use of CNC machines, does not allow the creation of cooling channels conforming to the geometry of the mould. In fact, these machines use drilling tools whose movement is limited, and which can therefore only drill straight channels in the metal. The channels resulting from this process involve very long cooling periods and therefore the lengthening of the production cycle with an associated increase in costs for the user of the mould.

A further problem resulting from the inadequacy of the cooling channels produced with CNC machines is the non-uniform cooling of the object produced by the mould. The linear channels cannot be conformed to the geometry of the object which will therefore cool in some parts with greater speed than others, thus creating the conditions for an increase in deformations and therefore in the discarded final products.

Finally, conventional production techniques require long planning times as they require the intervention of personnel with different specific skills, especially for the programming phases of the CNC machine. Consequently, there is a significant time gap between a customer's request for the mould and its actual production using conventional CNC machines.

Nowadays, the problems previously mentioned are solved using additive manufacturing techniques and the design of conforming cooling systems.

This solution, however, raises a further big problem, namely the much higher cost of the moulds compared to those produced by conventional techniques. The moulds are designed in the same way as conventional techniques and therefore require long production times and more material. This induces relatively high production cost.

From the point of view of the potential customer, that is the injection moulder, the high cost represents an element of deterrence as it requires a significant increase in the financial investment necessary to purchase the mould in return of uncertain subsequent savings.

Currently conformal cooling moulds are produced without a lattice structure. Some software houses are working to automate the integration of the lattice structure into the mould, as disclosed for example in US 2019/0111590 A1.

SUMMARY OF THE INVENTION

An aim of the invention is to provide an alternative solution for a mould for injection moulding made by additive manufacturing.

A further aim of the invention is to provide a method for producing such a mould.

According to the invention, there is provided a mould for injection moulding, comprising a mould body having a plurality of boundary surfaces, said plurality of boundary surfaces comprising at least one moulding surface configured to delimit a mould cavity, wherein said mould body is made by additive manufacturing, wherein said mould body comprises

- a functional domain portion on which said plurality of boundary surfaces and said at least one moulding surface are formed, said functional domain portion being composed of a solid, continuous material structure covering a fraction of the mould body, and
- an application domain portion which is the complement of the functional domain portion in the mould body, said application domain portion being composed of a three-dimensional material lattice structure comprising an ordered repetition of unit cells including a periodic minimal surface, wherein at least one geometrical parameter of said periodic minimal surface is tuned locally to form unit cells with different densities of material.

Furthermore, according to the invention there is provided a method for designing a mould according to any of the preceding claims, comprising

- a) providing a three-dimensional geometrical model of a mould to be designed,
- b) determining the functional domain portion and the application domain portion in the mould body of the mould,
- c) tuning said at least one geometrical parameter of said periodic minimal surface based on a physical model of the mould, and
- d) creating an electronic file storing data indicative of a digital model for constructing the mould by additive manufacturing.

The present invention combines the advantages deriving from the full exploitation of additive manufacturing with the reduction of the associated costs, due to the optimal design of the moulds which allows a considerable saving of machine time as well as the material used during the manufacturing process.

The use of additive manufacturing techniques allows the design and the creation of cooling channels conforming to the geometry of the mould. This allows a faster and more uniform cooling with consequent reduction of both the production cycle and the occurrence of deformations and distortions that cause the objects to be discarded.

Furthermore, the nature of the additive technique does not cause the production of material waste and therefore reduces the environmental impact of the activity. Finally, the mould is designed and subsequently produced with an optimal periodic minimal surface structure, for example a triply periodic minimal surface structure (hereinafter, TPMS structure), resulting in a decrease in the quantity of material needed and in the time of use of the machine, two fundamental cost factors in the additive manufacturing process.

The invention uses additive manufacturing techniques, more commonly known as 3D printing, to reduce cooling times by up to 75%, distortions up to 40% and production costs up to 60% in respect of the moulds produced with CNC techniques.

The inventors have found that the TPMS structure is of higher performance than the strut-based lattice structure disclosed by US 2019/0111590 A1, particularly for the injection moulding and die-casting industry.

The invention offers an efficient "green" solution, using down to around 10% of the volume of material necessary to produce a conventional mould.

In summary, the provision of a conformal cooling system leads to an improvement of the mould cooling cycle, with reduction in the cooling time, reduction of warpage or distortion effects and better microstructure of the object being produced by the mould.

On the other hand, the provision of a TPMS lattice structure leads to light weighting of the mould, putting material only where it is necessary, strong enough just to withstand the local loads in the mould.

BRIEF DESCRIPTION OF THE DRAWINGS

Further characteristics and advantages of the invention will be presented in the following detailed description, which refers to the attached drawings, provided purely by way of nonlimiting example, in which:

FIGS. 3*a-c* show a comparison between TPMS structures having different wall thicknesses;

DETAILED DESCRIPTION

Figure 1:
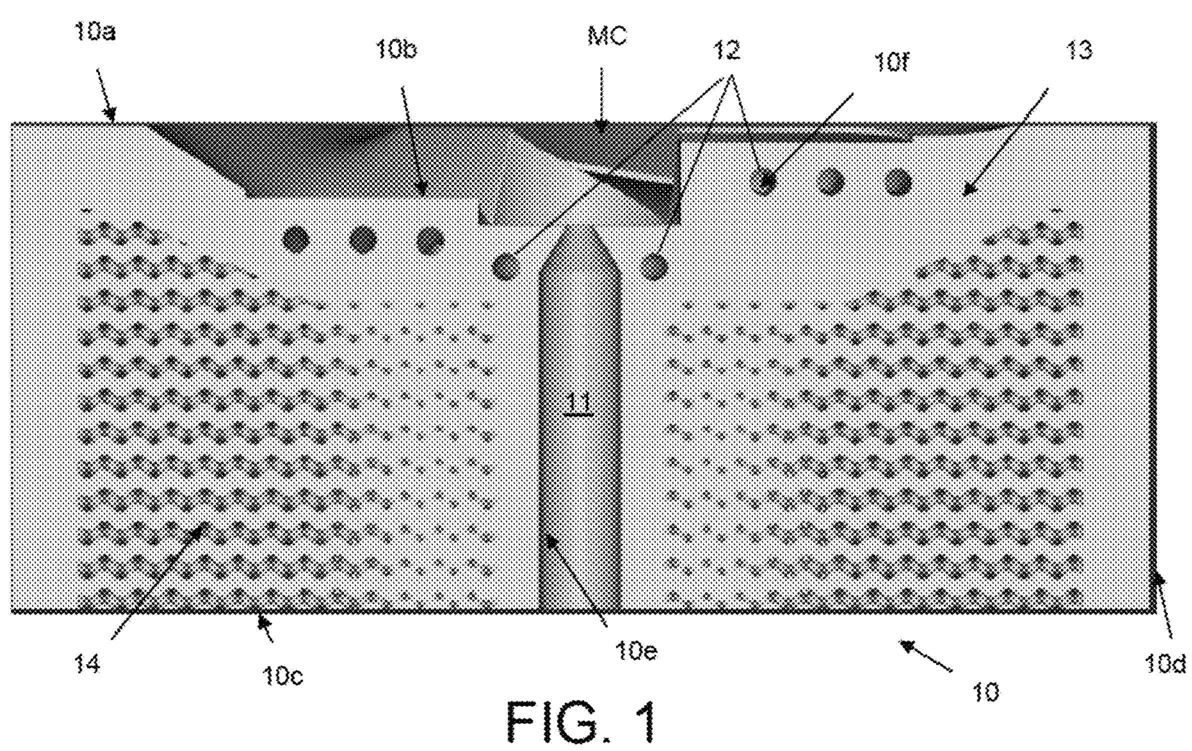
FIG. 1 is a cross-sectional view of a mould according to the invention.

FIG. 1 shows a mould for injection moulding according to the invention. The mould comprises a mould body 10 made by additive manufacturing, of metal material for example. The mould body 10 has a plurality of boundary surfaces, indicated with 10*a*-10*f*. In the illustrated example, the reference 10*a* designates a top surface of the mould, comprising at least one moulding surface 10*b* configured to delimit a mould cavity MC. The reference 10*c* designates a bottom surface of the mould, the reference 10*d* designates a lateral surface of the mould, the reference 10*e* designates a surface of an injection channel 11 formed into the mould body 10, and the reference 10*f* designates a surface of a conformal cooling channel 12 formed into the mould body 10. For the sake of simplicity, only the surface of one of the conformal cooling channels 12 of the mould is indicated by reference number 10*f* in FIG. 1.

The mould body 10 comprises a functional domain portion 13 on which the boundary surfaces 10*a*-10*f* are formed. The functional domain portion 13 is composed of a solid, continuous material structure covering a fraction of the mould body 10. In other words, the functional domain portion 13 is a fraction of the mould body 10 which is without lattice.

The mould body 10 further comprises an application domain portion 14 which is the complement of the functional domain portion 13 in the mould body 10. In other words, the application domain portion 14 is the remaining fraction of the mould body 10, once the functional domain portion 13 is excluded.

The application domain portion 14 is composed of a three-dimensional material lattice structure comprising an ordered repetition of unit cells including a periodic minimal surface, a triply periodic minimal surface for example, in particular a gyroid surface. At least one geometrical parameter of the periodic minimal surface is tuned locally to form unit cells with different densities of material. In the example shown in FIG. 1, this geometrical parameter is the wall thickness of the periodic minimal surface, which is thicker in an area of the application domain portion 14 closer to the injection channel, and thinner in an area of the application domain portion 14 closer to the lateral surface 10*d* of the mould.

The functional domain portion 13 surrounds the injection channel 11, and the application domain portion 14 surrounds the functional domain portion 13 around the injection channel 11.

The functional domain portion 13 also surrounds the conformal cooling channels 12. According to an alternative embodiment (not shown), the application domain portion could cover also areas where the conformal cooling channels are located. TPMS or other periodic minimal surfaces incorporated inside the conformal cooling channels may induce turbulent flow and hence improve the cooling transfer efficiency. According to a further embodiment (not shown), the conformal cooling channels could be eliminated and the voids intrinsically formed by the TPMS structure could be used to provide cooling channels.

A method for designing the conformal channels 12 of the mould can be as follows.

An initial thermal simulation of the mould is made to determine the room for thermal improvement of the mould that leads to improvement of the cooling cycle of the object being produced by the mould. This object could be metal as in die-casting process or in plastic as in injection moulding process. Afterwards a conformal cooling system is designed using a commercial CAD software.

The effect of introducing the conformal cooling system is then measured by another thermal simulation to see the improvements of the newly designed conformal cooling with respect to the initial thermal simulation.

Having done this, a structural analysis simulation is made on the mould to see if there are any deformations in the mould.

A method for designing the periodic minimal surface in the mould can be as follows, assuming for the sake of simplicity that the TPMS is a gyroid.

The gyroid is a triply periodic minimal surface discovered in 1970 by NASA scientist Alan Schoen. The gyroid divide the space in two isometric domains. The mathematical description of the gyroid surface can be trigonometrically approximated by a short equation:

$$U = (\cos(k_x x)\sin(k_y y) + \cos(k_y y)\sin(k_z z) + \cos(k_z z)\sin(k_x x))^2 - t^2, \quad (1)$$

where $k_i$ are the TPMS function periodicities, defined by $$k_i = 2\pi\frac{n_i}{L_i}$$

Figure 2:
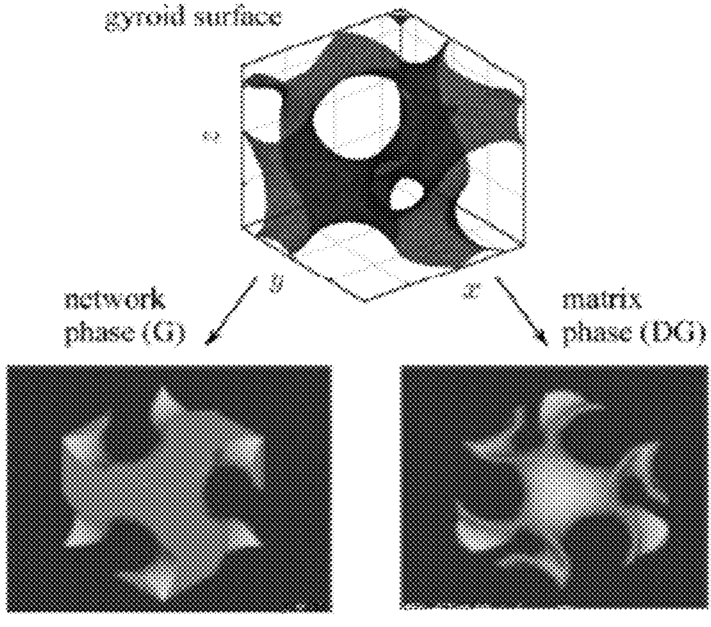
FIG. 2 shows a comparison between a network phase lattice and a matrix phase lattice derived from a gyroid surface.

(with I=x, y, z), $n_i$ are the numbers of cell repetitions in x, y and z, and Li are the absolute sizes of the structure in those dimensions. Matrix phase lattices comprise a wall of solid material bounded by two unconnected void regions. These are distinct from network phase structures, which contain only one solid and one void region. This is illustrated in FIG. 2.

TPMS equations describe 3D surfaces which, for the purpose of additive manufacturing, can be taken as the boundary between void and solid material. Matrix phase gyroid structures with arbitrary numbers of cells and volume fractions can be generated by finding the U=0 isosurface of the equation (1).

A porous solid of volume fraction 0.5 is obtained by filling one of the two separated domains. Another approach to obtain a solid from the gyroid surface consists of "offsetting" the original surface, i.e. creating a surface on which any point is at a constant distance of the original one, in two opposite directions, and filling the space in between. The resulting solid has lower volume fractions (<0.5). A third approach is a mix of the two previously described ones, an "offset" of the original surface is built, separating the space in two non-isometric domains (one with a volume fraction larger than 0.5 and the other one smaller than 0.5), and one of the two domains is filled to obtain a solid.

In Eq. (1), t effectively controls the thickness of the cell walls, and thus also the volume fraction, $\rho^*$, of the resulting lattice structure. The relationship between t and $\rho^*$ is unique for each TPMS. FIG. 3*a-c* show a comparison between three lattice structures having different wall thickness and, therefore, different densities of material. In particular, FIG. 3*a* shows a lattice structure with thinner walls and FIG. 3*c* shows a lattice structure with thicker walls.

Moreover, it is possible to extend the range of geometrical designs applying the three previously described base concepts to other periodic minimal surfaces or gyroid-likes surfaces.

The periodic solids, hereinafter referred to as gyroid lattice, are promising substitutes to the classical truss-like lattice structures. One of the main disadvantages of using such structures lies in the stress concentrations arising from sharp variations of the outer surface curvatures. The stress concentrations will dramatically reduce the resistance of the structure under load and its life-time under cyclic load. On the other hand, the gyroid belongs to the family of triply periodic minimal surfaces (TPMS), a subset of the larger class of constant mean curvature (CMC) surfaces. In particular, TPMS are categorized by their zero-mean curvature at every point, with controlled variations, which tackle the main drawback of introducing a standard strut-based lattice structure within a solid.

Moreover, in the strut based lattice structure there is a problem of overhanging that needs support structure for successful manufacturing. In TPMS this is not needed as each layer acts as a support for the successive layer.

Figures 3, 4:
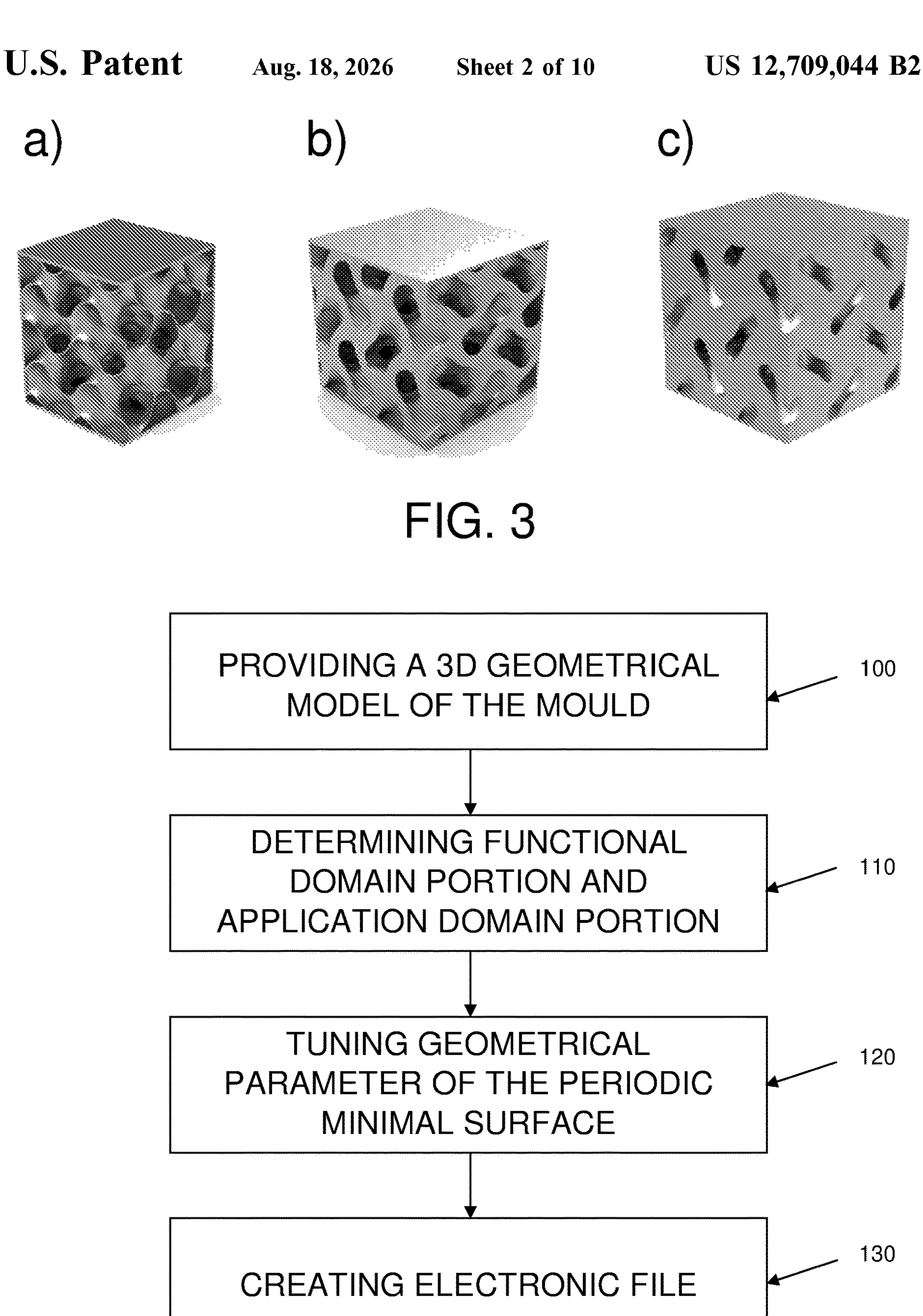
FIG. 4 is a block diagram representing a design method according to the invention.
Figure 5:
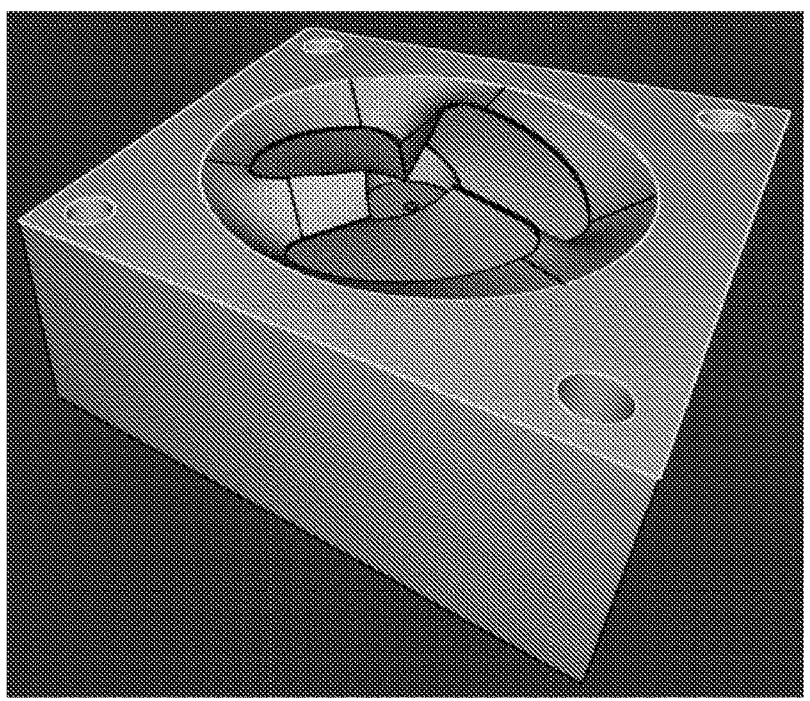
FIGS. 5-9 are schematic representations of a mould showing different phases of the design method.
Figure 6:
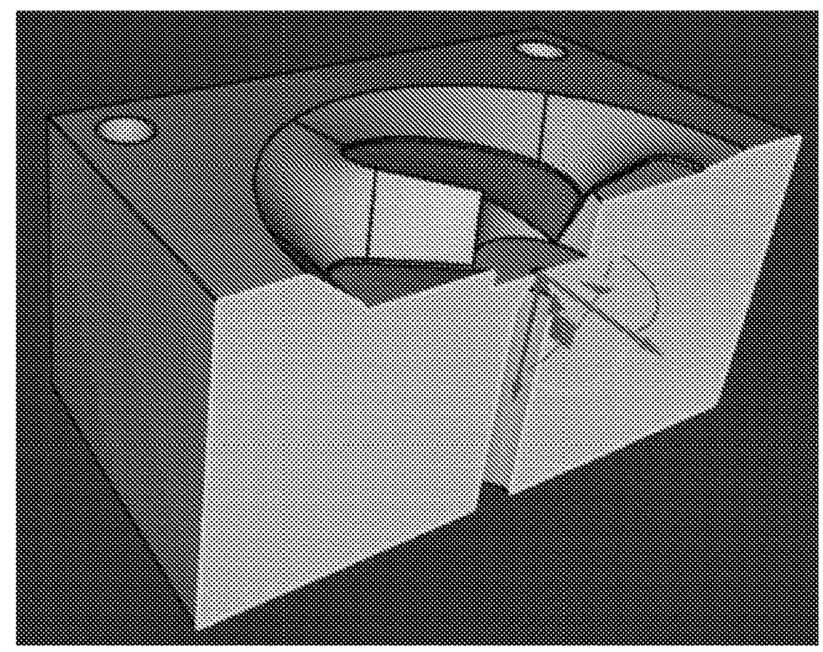

With reference now to FIG. 4, a method according to the invention comprises providing a three-dimensional geometrical model of a mould to be designed (step 100). This model defines the geometrical features of the mould, such as for example boundary surfaces, moulding surfaces, injection channels, cooling channels and so on. FIGS. 5 and 6 are perspective and cross-sectional representations, respectively, of this 3D model.

Figure 7:
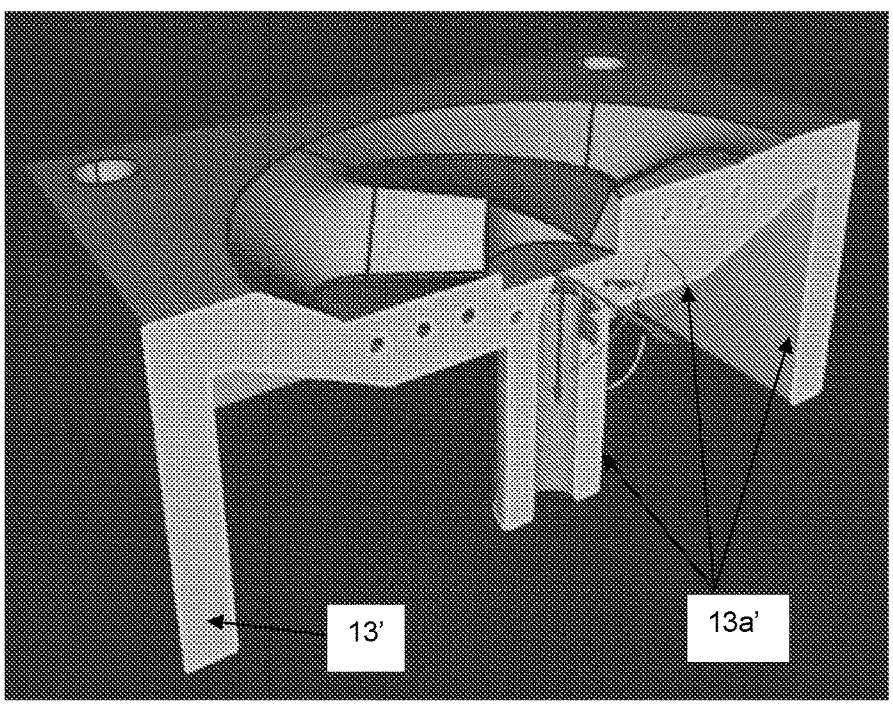

Then the above described lattice structure is implemented within the 3D model (step 110). This step is performed by the definition of the so called "application domains". The initial 3D model is a closed solid delimitated by surface boundaries. Theses surface boundaries are divided in two categories, the functional ones that should remain unchanged, such as a mold cavity/core surfaces 10*b*, the cooling channels surface 10*f* and so on; and the non-functional surface boundaries such as the base plane 10*c* of a mold. Once the two surface boundaries have been defined, the lattice structure is included within the model by the following method:

First, an offset of the functional boundaries is obtained, i.e. obtaining a set of surfaces on which any point is at a given distance of the original functional boundaries set. By filling the space between the offset set of surfaces (indicated by 13*a*' in FIG. 7) and the original functional boundary surfaces, and eventually adding closing surfaces, we obtain a set of closed boundaries solids, the so-called functional domain 13' (shown in FIG. 7).

Figure 8:
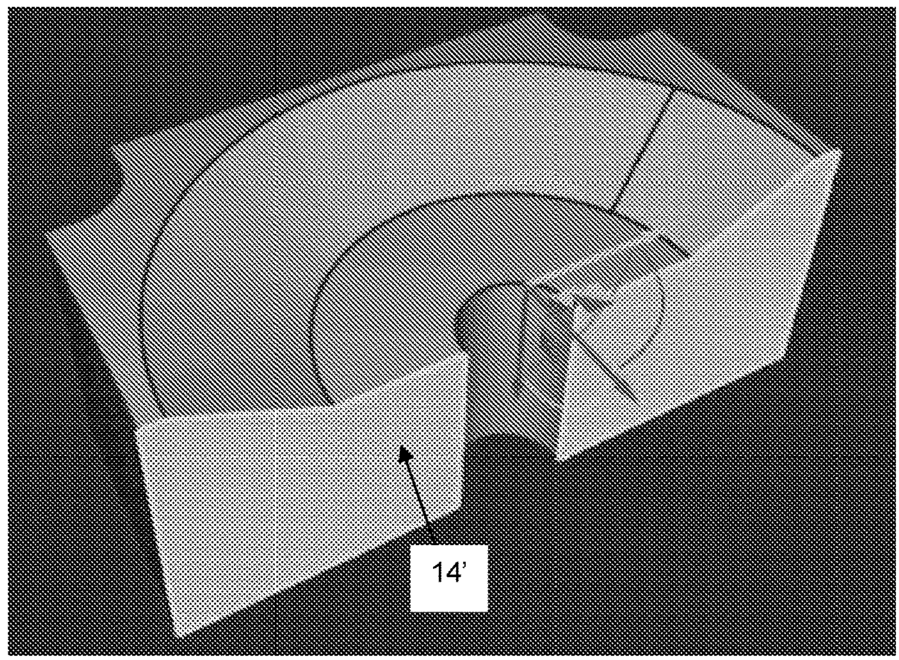
Figure 9:
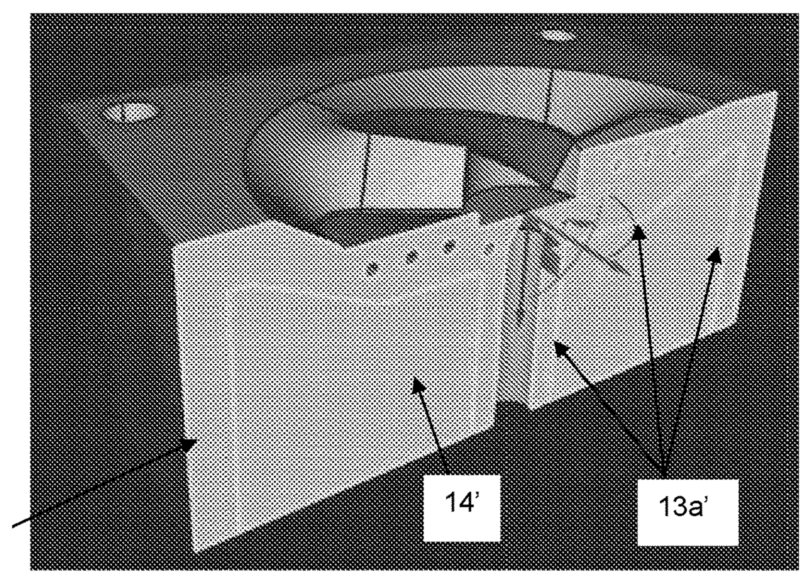

Second, we subtract the functional domain from the initial 3D model. This can be performed trough a Boolean operation. The resulting solids are called "application domains", indicated by 14' in FIG. 8. FIG. 9 shows the 3D model with both functional and application domains 13', 14'.

Third, the application domain 14' is filled with the lattice structure. The resulting lattice is finally summed to the functional domain.

With reference to FIGS. 10-18, a method for applying the lattice structure to the application domain 14' is discussed hereinbelow.

Figure 10:
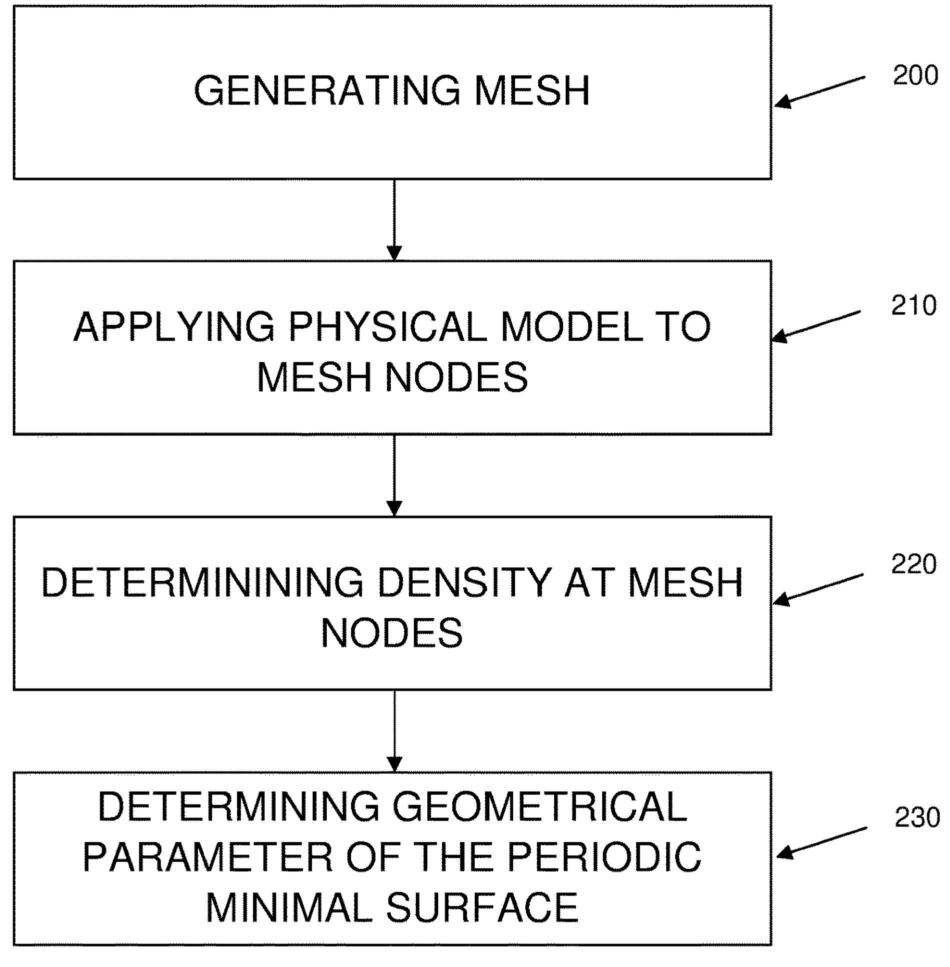
FIG. 10 is a block diagram further detailing the method of FIG. 4.
Figure 11:
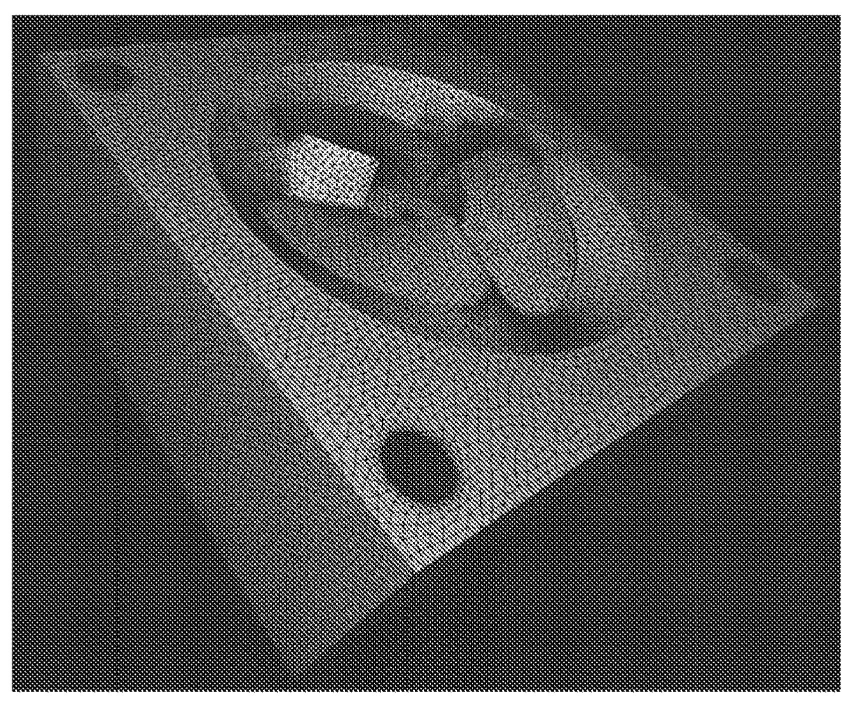
FIGS. 11-19 are further representations showing different phases of the design method.
Figure 12:
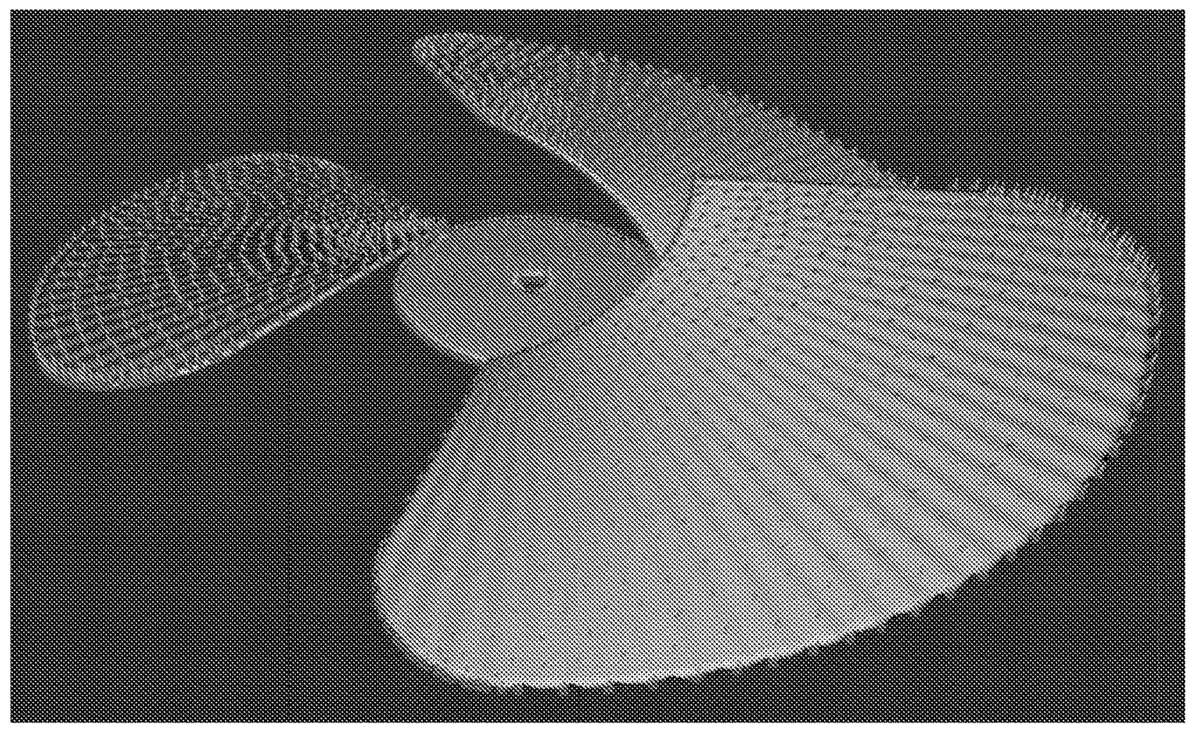

As shown in FIG. 11, a mesh is generated for the whole mold (functional and application domain) along with the application of the physical model (forces, pressure, thermal loads, support constraints, etc.) on the nodes of the generated mesh (steps 200 and 210 in FIG. 10). FIG. 12 shows an example of applying a boundary condition to the moulding surfaces (force on mesh nodes).

Then topology optimization is held to provide an optimal solution by putting material within the application domain to achieve the required loads imposed by the boundary conditions defined in step 210.

Figure 13:
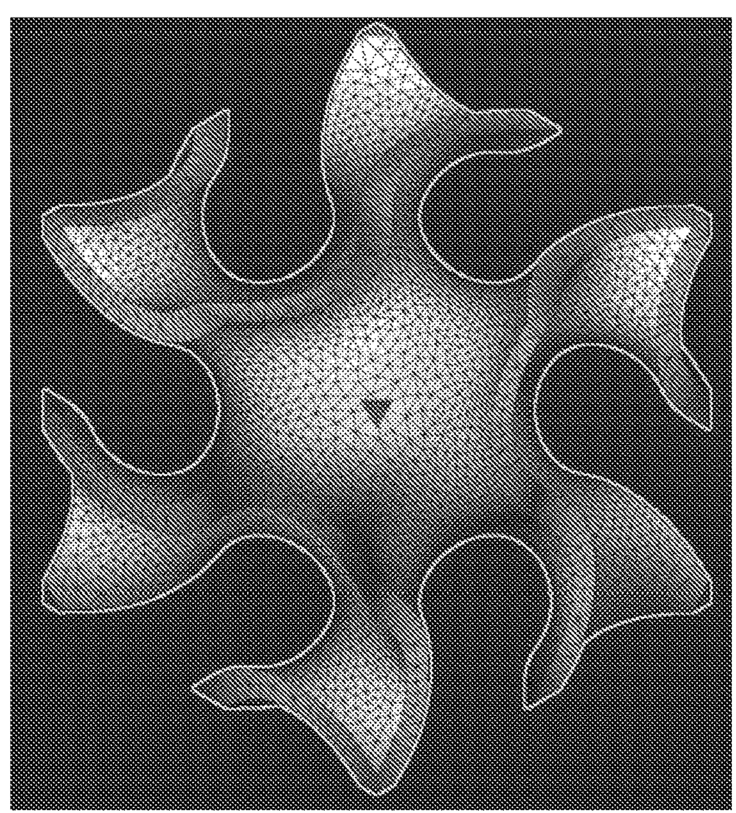
Figure 14:
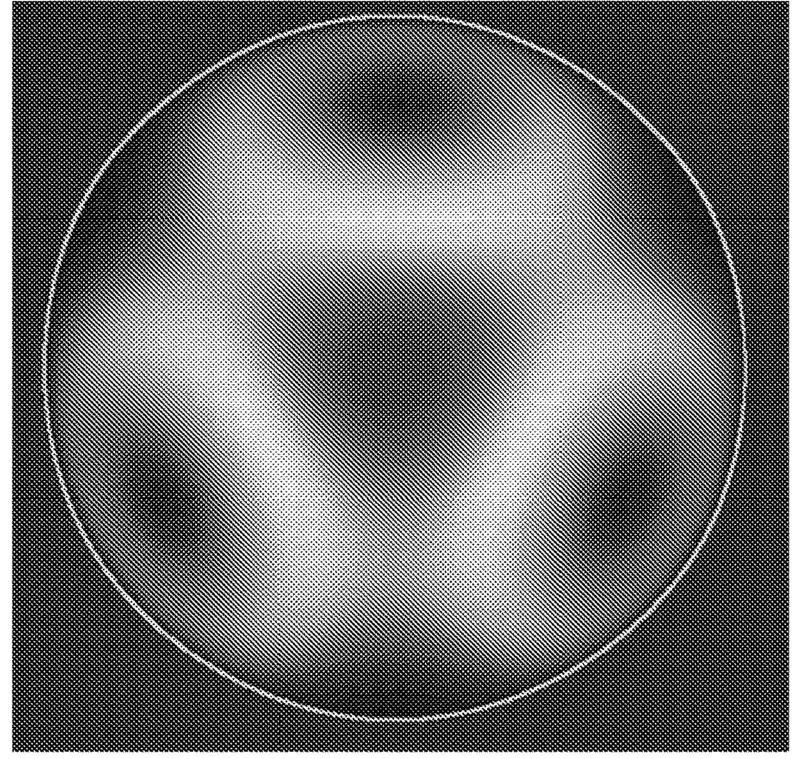

The optimization problem can be divided in 3 main parts:

1—Model Mesh definition: which is related to the mesh of the application and the functional domain. Attributes to the model are also defined in that stage, for example the material used. FIGS. 13 and 14 show in grayscale the mechanical properties (elasticity modulus) of one cell of gyroid structure.

2—Optimization objective: optimization function is determined in this stage. The objective function used herein is to identify the optimal distribution of the material density in order to minimize the structure compliance.

3—Optimization Constraints: Eventually the optimization constraints are identified for example: the total volume of the removed material should not exceed 30% of the total available material.

Figure 15:
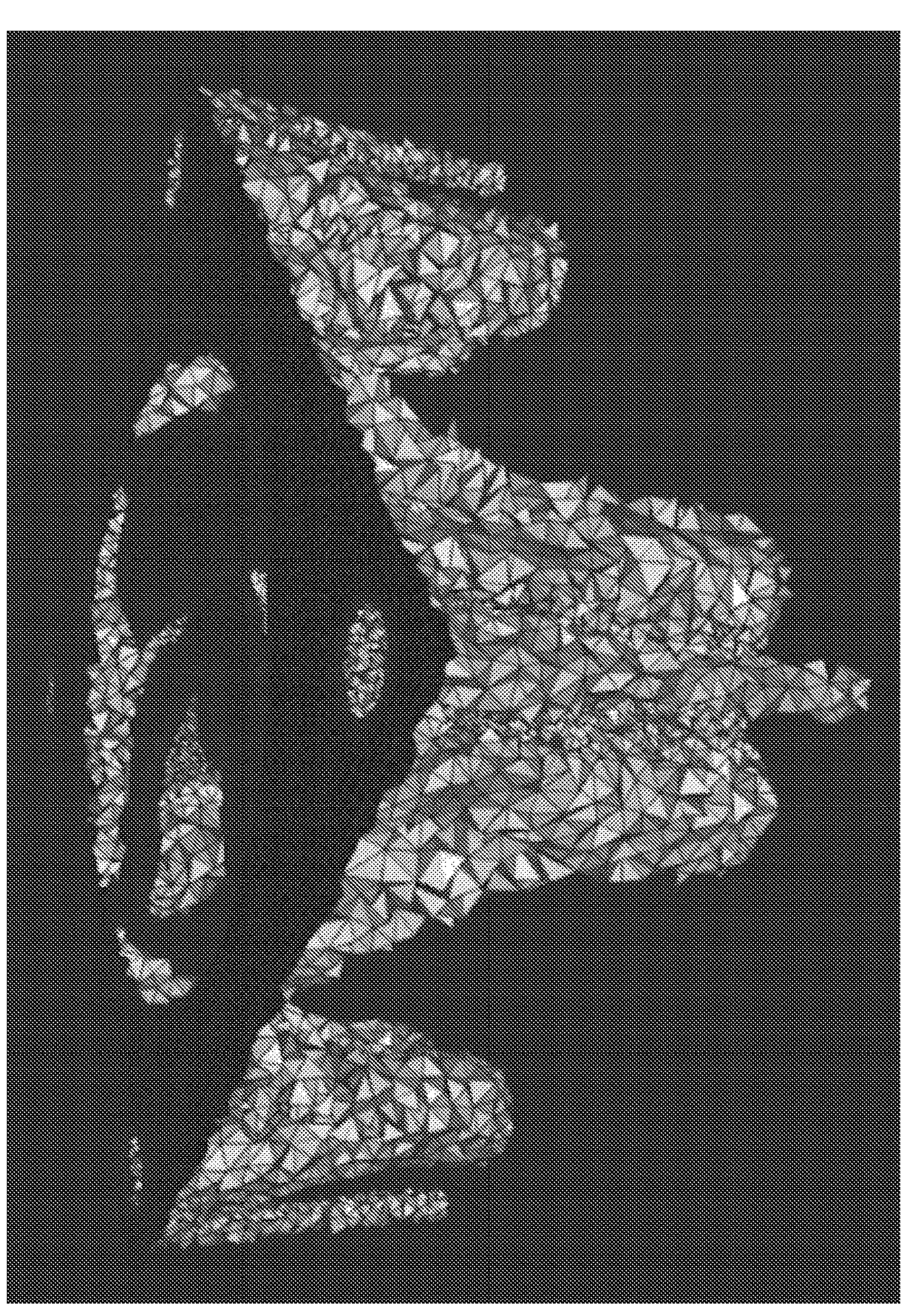

After several optimization iterations, the optimal density is obtained for the whole structure (step 220). FIG. 15 shows the optimal volume fraction for each FE element.

In order to optimize, the "application domain" is mapped so that each node of the FEM model is assigned to a given cell unit of the lattice structure. This map of nodes to lattice cell units is called the "geometric map". As described above, the gyroid lattice properties can be tuned locally by means of geometrical parameters, the wall thickness for example. Those geometrical features represent the local density of a given lattice cell. These geometrical features can be included with the FEM calculations by adapting accordingly the local polynomial functions that represent the behavior of the lattice. We therefore create a "property map" of the lattice structure within the "application domain"; the local polynomial functions for an element of the FEM calculation is obtained as the average properties of the nodes based on their location within the "geometric map" and the properties of the corresponding cell unit within the "property map".

Once FEM has provided a field of solution, the "property map" of the lattice can be modified for optimizing the overall structure. All local properties are reset to aim at a more homogeneous solution, and a reduction of stress or thermal load to respond to a given criterion. This last method can be lopped over until the solution satisfies technical specifications. This will ensure an improved life-time and reduce potential early cycle failure of the part.

Figure 16:
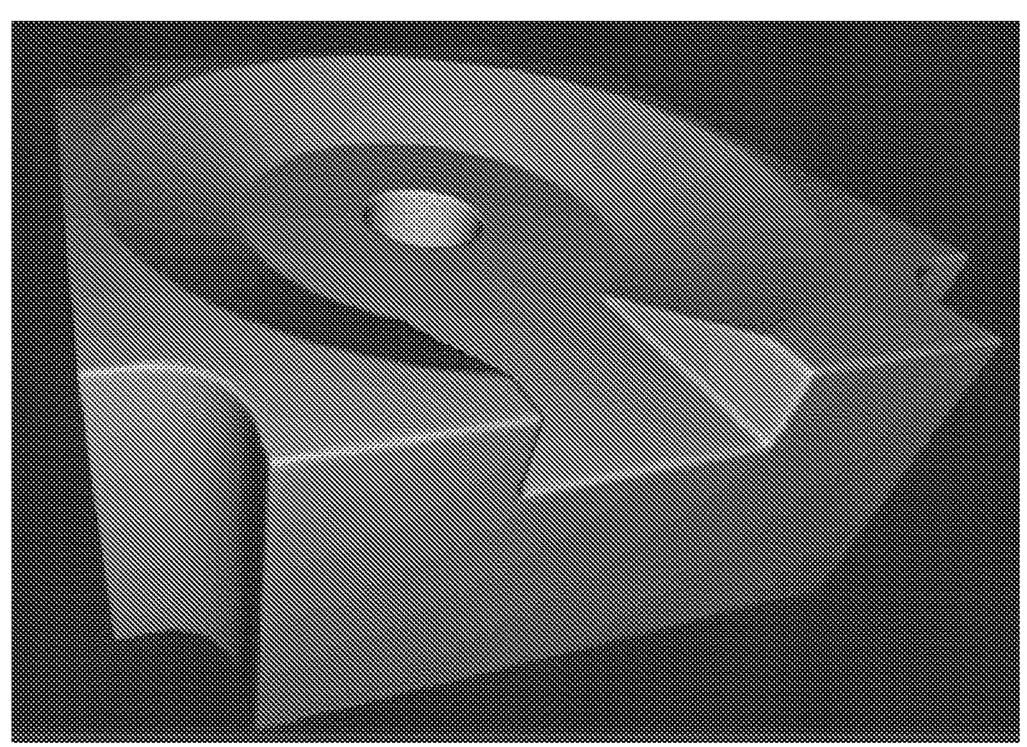
Figure 17:
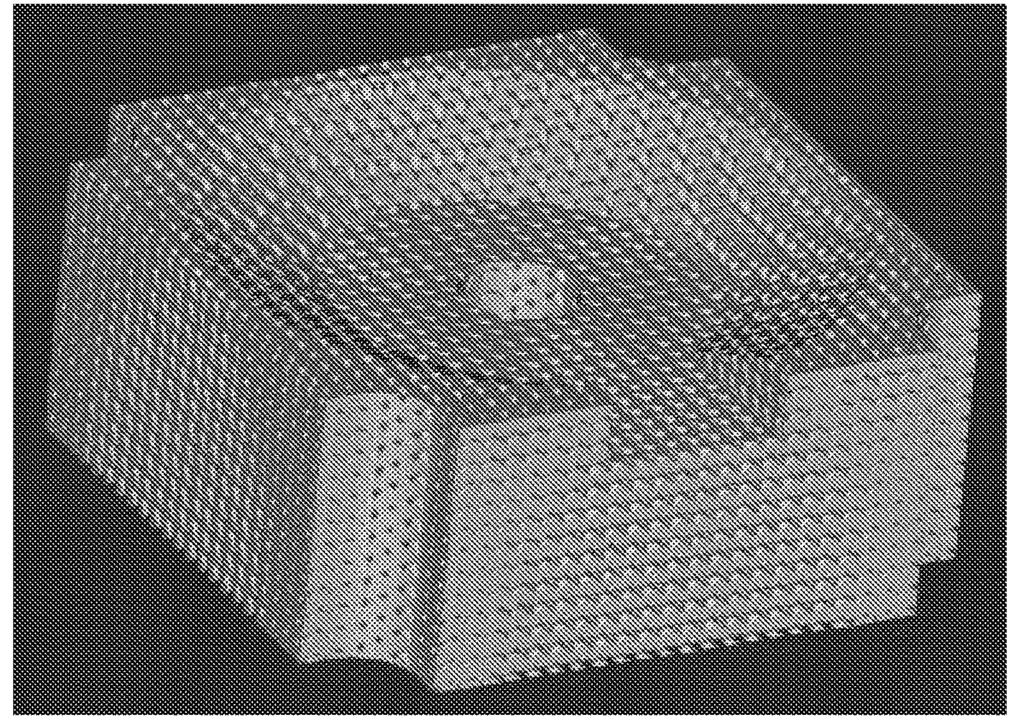
Figure 18:
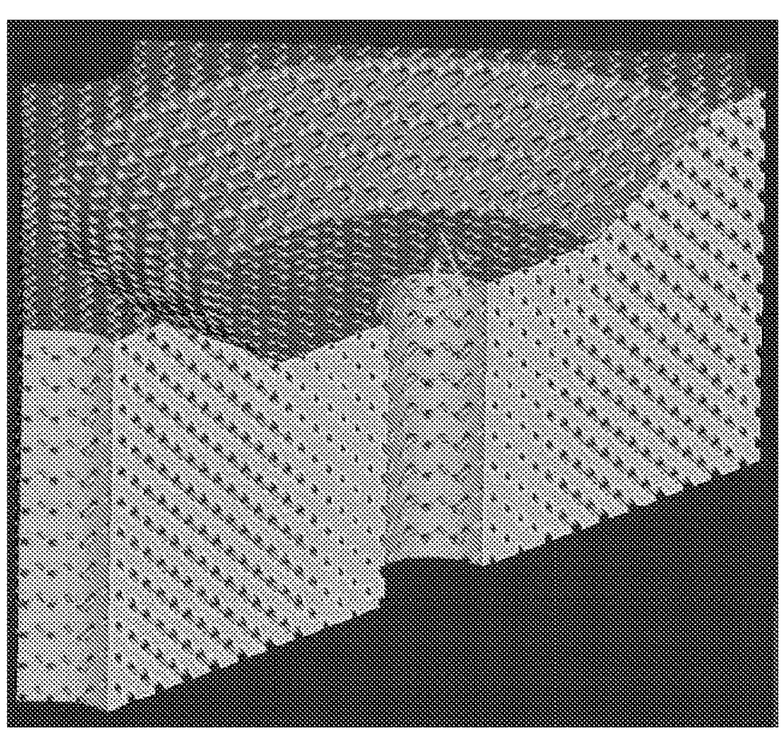

The final lattice design is obtained by setting the local geometries of each unit cell according to the density of the unit cell (step 120 in FIG. 4 and step 230 in FIG. 10), based on the optimized "property map" at the end of the FEM homogenization process. FIG. 16 shows the application domain before the optimization process, while FIGS. 17 and 18 show the application domain after the optimization process. FIG. 18 is a 45° section cut of the application domain.

Figure 19:
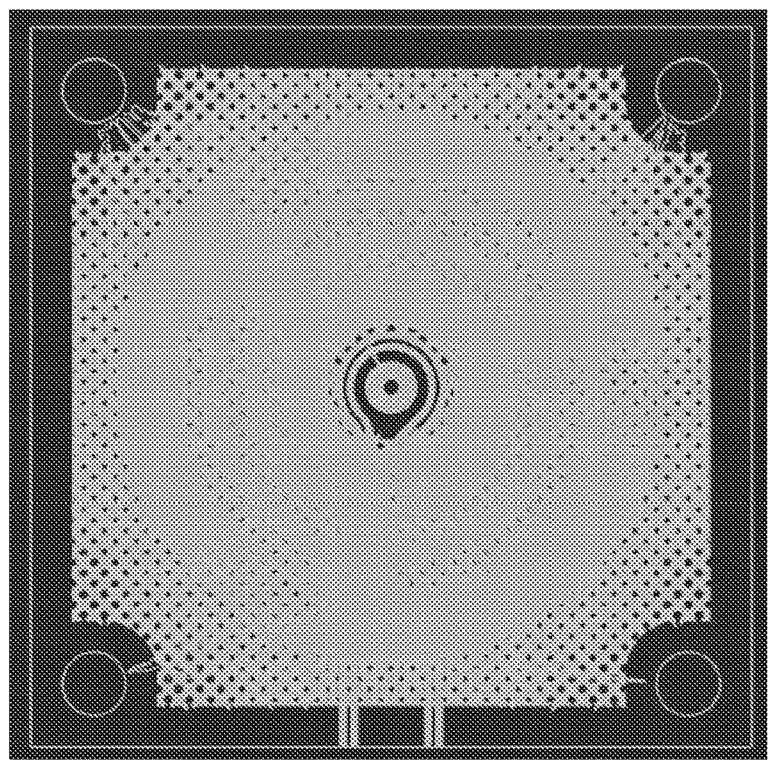

The electronic, e.g. CAD file along with manufacturing parameters is then stored on the cloud/servers for the clients to access and start the additive manufacturing process (step 130 in FIG. 4). FIG. 19 is a section view of sliced model that incorporates the manufacturing parameters.

The invention claimed is:

1. A mould for injection moulding, comprising a mould body comprising a plurality of boundary surfaces, said plurality of boundary surfaces comprising at least one moulding surface configured to delimit a mould cavity, wherein said mould body is made by additive manufacturing, and wherein said mould body further comprises a functional domain portion on which said plurality of boundary surfaces and said at least one moulding surface are formed, said functional domain portion being composed of a solid, continuous material structure covering a fraction of the mould body, and an application domain portion which is the complement of the functional domain portion in the mould body, said application domain portion being composed of a three-dimensional material lattice structure comprising an ordered repetition of unit cells including a periodic minimal surface, wherein at least one geometrical parameter of said periodic minimal surface is tuned locally to form unit cells with different densities of material, wherein said mould body comprises at least one conformal cooling channel formed into the mould body, and wherein said application domain portion surrounds said at least one conformal cooling channel in such a way that said periodic minimal surface is incorporated inside said at least one conformal cooling channel.

2. The mould of claim 1, wherein said periodic minimal surface is a triply periodic minimal surface.

3. The mould of claim 2, wherein said periodic minimal surface is a gyroid.

4. The mould of claim 1, wherein said mould body comprises at least one injection channel, wherein said functional domain portion surrounds said at least one injection channel, and wherein said application domain portion surrounds said functional domain portion around said at least one injection channel.

5. The mould of claim 1, wherein said mould body comprises at least one further conformal cooling channel, and wherein said functional domain portion surrounds said at least one further conformal cooling channel.

6. The mould of claim 1, wherein a further cooling channel is formed by voids intrinsically originated by the periodic minimal surface.

7. A method for designing a mould for injection moulding, comprising:

a) providing a mould body made by additive manufacturing and comprising:

a plurality of boundary surfaces, said plurality of boundary surfaces comprising at least one moulding surface configured to delimit a mould cavity, a functional domain portion on which said plurality of boundary surfaces and said at least one moulding surface are formed, said functional domain portion being composed of a solid, continuous material structure covering a fraction of the mould body, an application domain portion which is the complement of the functional domain portion in the mould body, said application domain portion being composed of a three-dimensional material lattice structure comprising an ordered repetition of unit cells including a periodic minimal surface, wherein at least one geometrical parameter of said periodic minimal surface is tuned locally to form unit cells with different densities of material, and at least one conformal cooling channel formed into the mould body, and wherein said application domain portion surrounds said at least one conformal cooling channel in such a way that said periodic minimal surface is incorporated inside said at least one conformal cooling channel, b) providing a three-dimensional geometrical model of the mould to be designed, c) determining the functional domain portion and the application domain portion in the mould body of the mould, d) tuning said at least one geometrical parameter of said periodic minimal surface based on a physical model of the mould, and e) creating an electronic file storing data indicative of a digital model for constructing the mould by additive manufacturing.

8. The method of claim 7, wherein step d) comprises d1) generating a mesh for both the functional and application domain portions and applying the physical model on a plurality of nodes of the generated mesh, d2) determining values of density of material at the nodes of the generated mesh based on the applied physical model, and d3) determining values of said at least one geometrical parameter of said periodic minimal surface complying with the determined values of density of material.

* * * * *